Figures 8, 9, 10, 11:
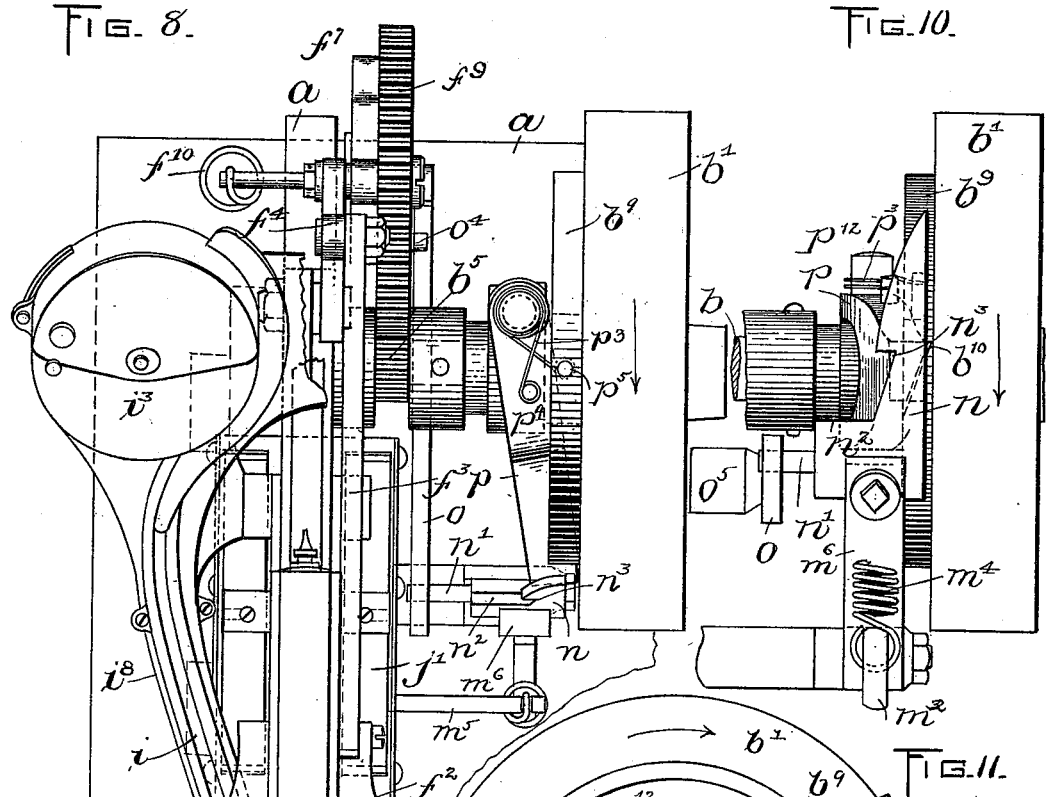

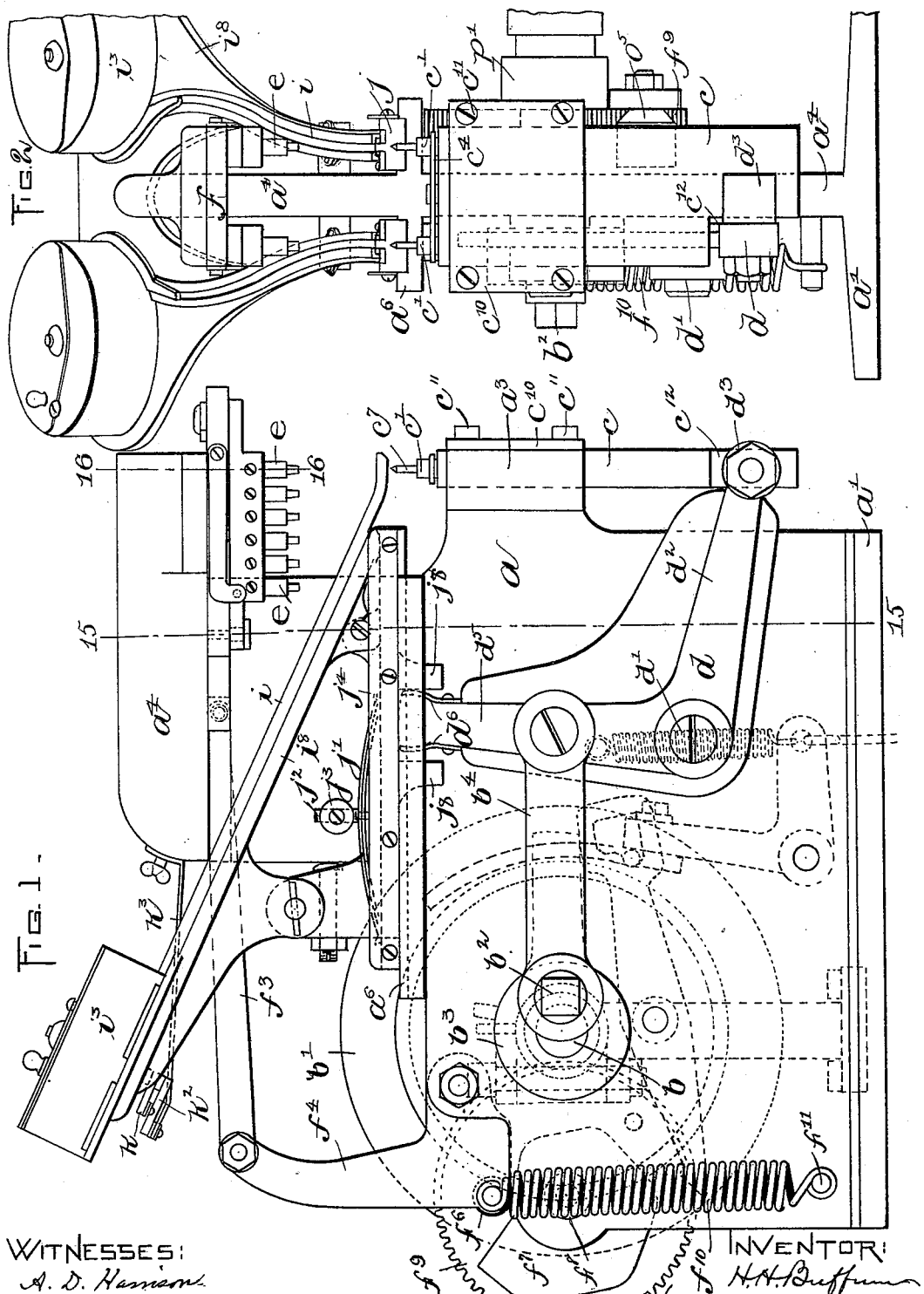

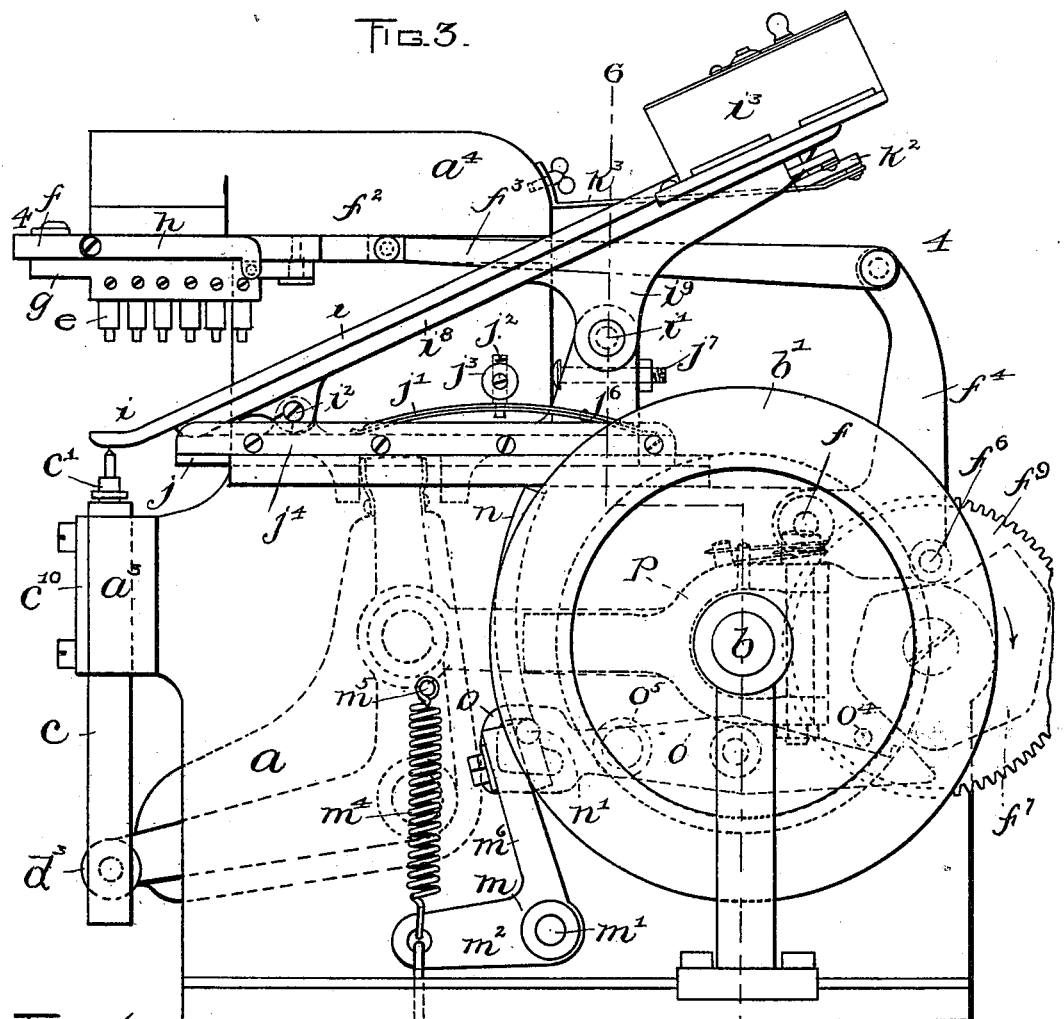
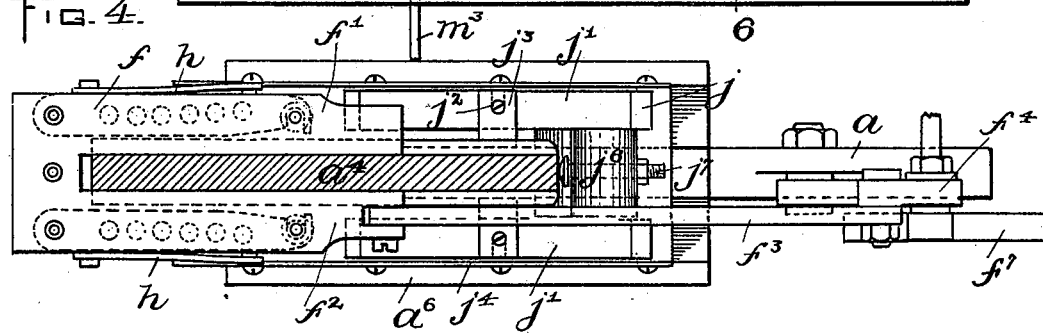

No. 626,050. Patented May 30, 1899.
H. H. BUFFUM.
EYELETING MACHINE.
(Application filed Jan. 7, 1898.)
(No Model.) 7 Sheets—Sheet 3.
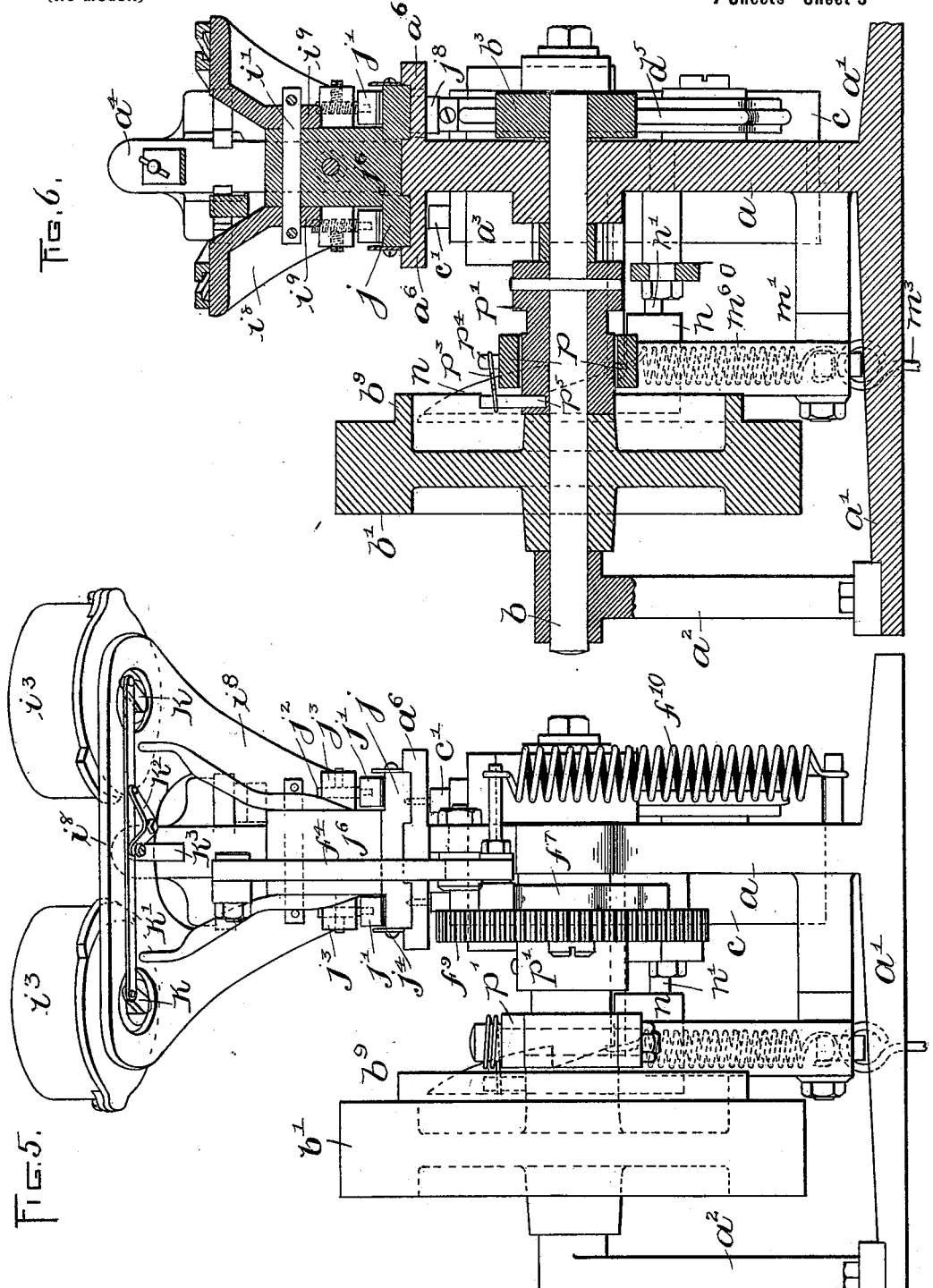
WITNESSES:
A. D. Harrison.
P. W. Pezzetti.
INVENTOR:
H. H. Buffum
by Wright Brown & Quimby
attys.

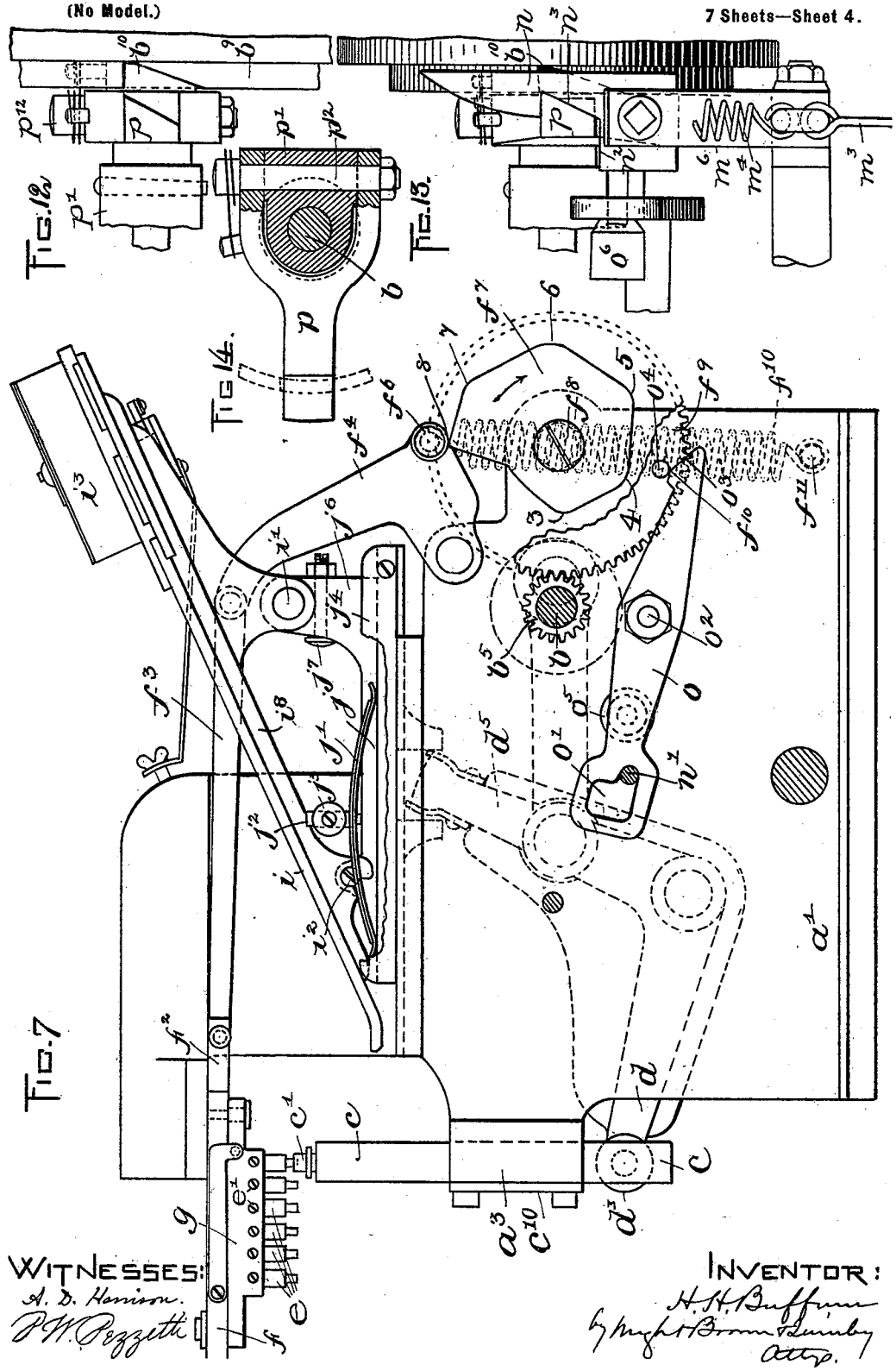

No. 626,050. Patented May 30, 1899.
H. H. BUFFUM.
EYELETING MACHINE.
(Application filed Jan. 7, 1898.)
(No Model.) 7 Sheets—Sheet 5.

WITNESSES:
A. D. Harrison
P. W. Pezzetti

INVENTOR:
H. H. Buffum
by Wright Brown & Quimby
Attys.

No. 626,050. Patented May 30, 1899.
H. H. BUFFUM.
EYELETING MACHINE.
(Application filed Jan. 7, 1898.)
(No Model.) 7 Sheets—Sheet 6.
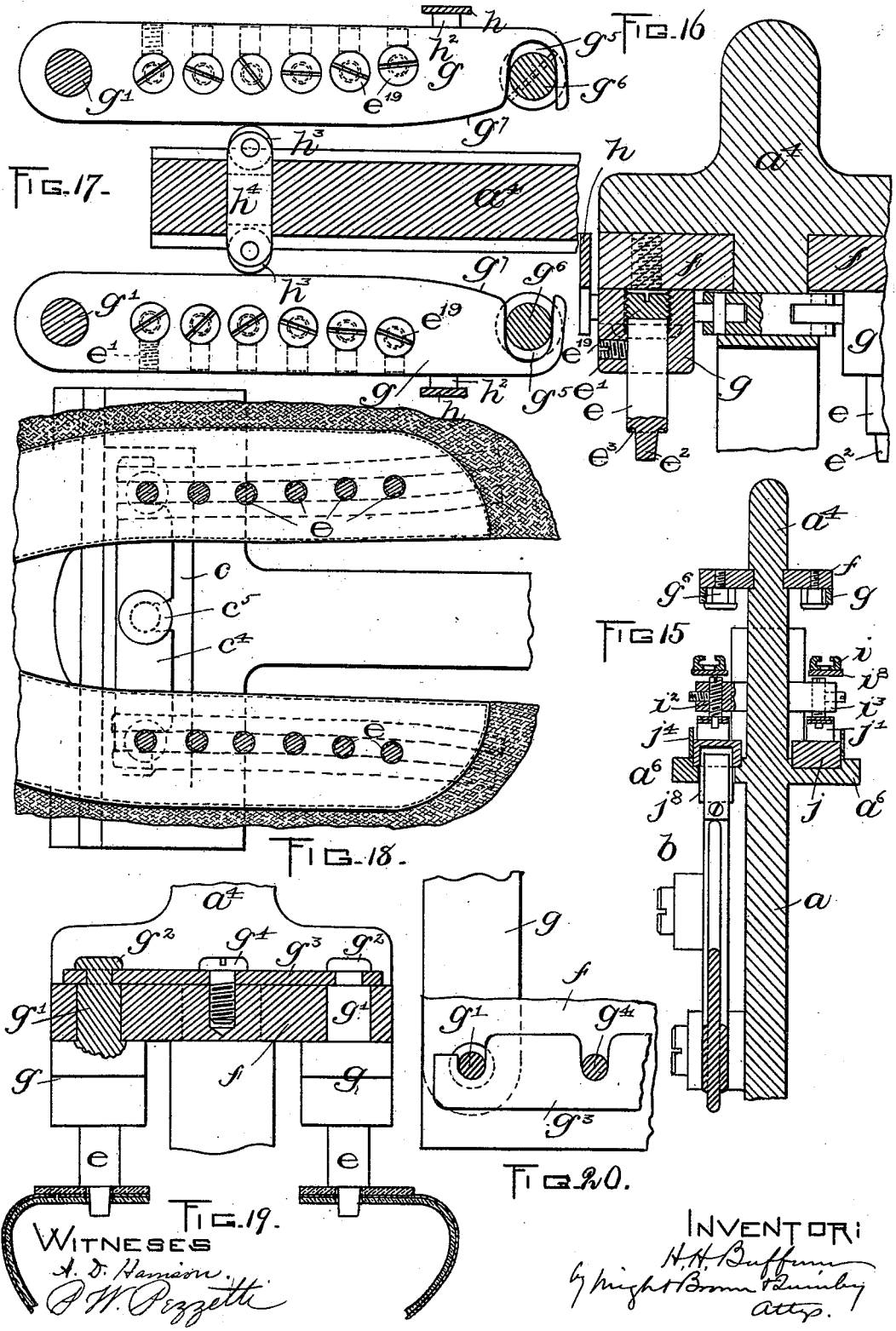
WITNESSES
A. D. Harrison
J. W. Pezzetti
INVENTOR
H. H. Buffum
by Wright, Brown & Quinby
attys.

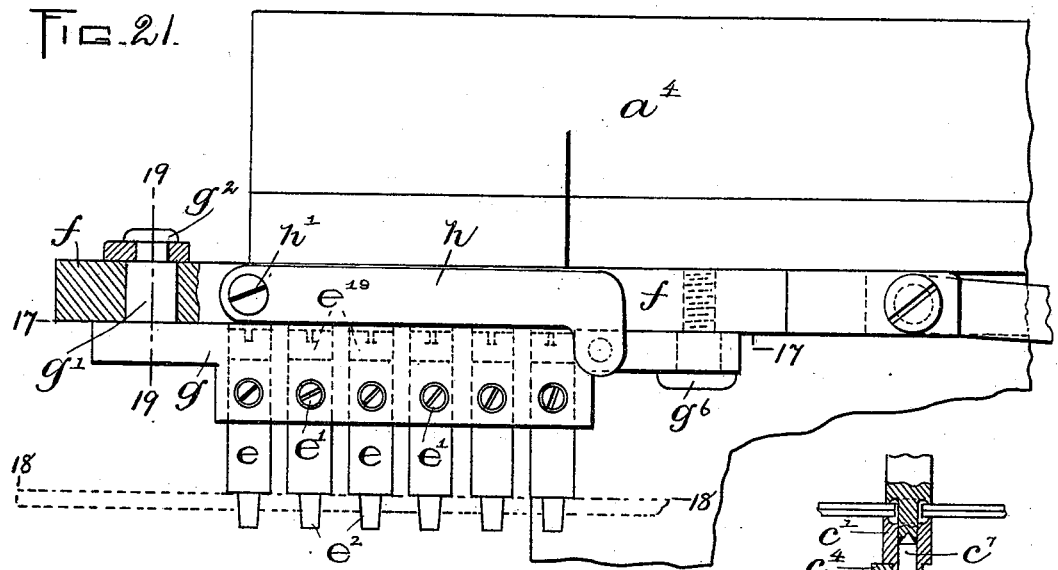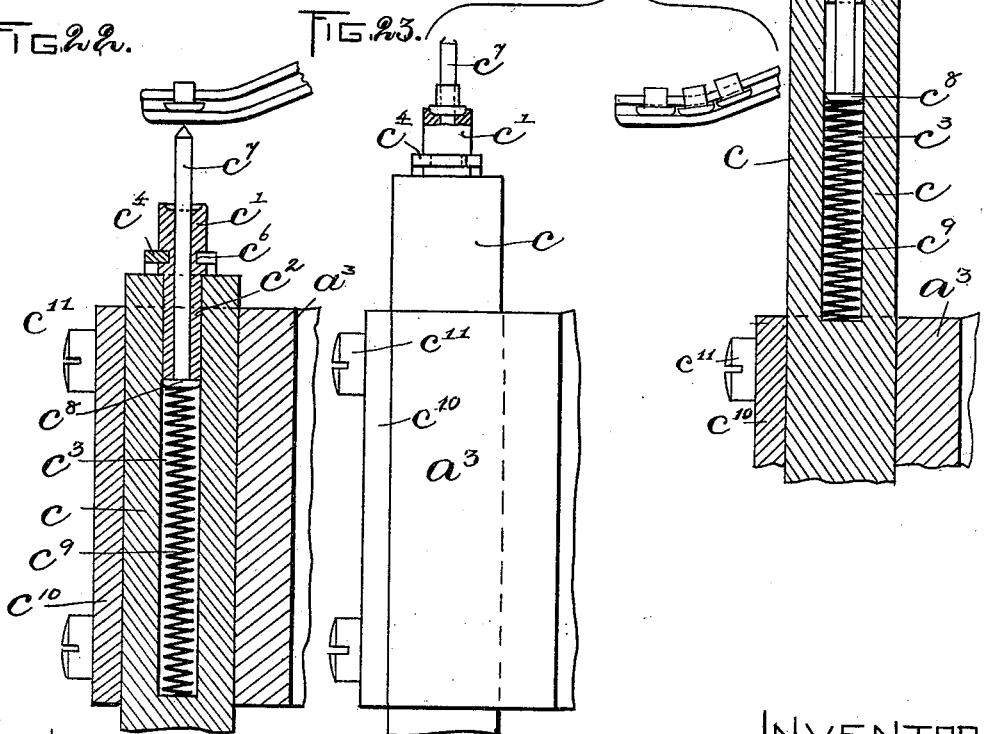

UNITED STATES PATENT OFFICE.

HERBERT H. BUFFUM, OF ABINGTON, MASSACHUSETTS.

EYELETING-MACHINE.

SPECIFICATION forming part of Letters Patent No. 626,050, dated May 30, 1899.

Application filed January 7, 1898. Serial No. 665,877. (No model.)

*To all whom it may concern:*

Be it known that I, HERBERT H. BUFFUM, of Abington, in the county of Plymouth and State of Massachusetts, have invented certain new and useful Improvements in Eyeleting-Machines or Machines for Setting Fastenings, of which the following is a specification.

This invention has relation to eyeleting-machines or machines for setting fastenings, and has for its object to provide a machine by means of which eyelets may be automatically inserted in the uppers of shoes with greater rapidity than heretofore.

It has generally been customary in eyeleting-machines to arrange the sets so that they insert the eyelets, one at a time, first along one edge of an upper, the work being fed forward automatically, and then along the other edge thereof. This operation consumes a great deal of time and involves a large expenditure of money by reason of its comparative slowness.

In contrast to these machines my invention consists of a mechanism by means of which a pair of eyelets may be set automatically in both edges of the upper at the same time, whereby the work of eyeleting a large number of uppers may be accomplished in one-half the time heretofore required for the operation.

The invention also consists in certain features of construction and arrangement of parts whereby the work may be fed forward with accuracy and the eyelets may be placed at any desired distance from the edge of the work without a manually-operated adjusting device.

The invention further consists of certain other features of improvement, which are illustrated upon the drawings and which I shall now proceed to describe in detail and then point out in the claims hereunto annexed.

Reference is to be had to the accompanying drawings, and to the letters and figures marked thereon, forming a part of this specification, the same letters and numerals indicating the same parts in all of the figures.

Of the drawings, Figure 1 represents in side elevation an eyeleting-machine embodying my invention. Fig. 2 represents a front elevation of the same. Fig. 3 represents an elevation of the machine on the side opposite to that shown in Fig. 1. Fig. 4 represents a section on the line 4 4 of Fig. 3. Fig. 5 represents a rear end elevation of the machine. Fig. 6 represents a section taken on the line 6 6 of Fig. 3. Fig. 7 represents a side elevation similar to that in Fig. 3, except that some of the parts are broken away to illustrate features shown in dotted lines in the said last-mentioned figure. Fig. 8 represents a plan view of the machine with a part broken away to show the clutch. Fig. 9 shows in detail a carriage for the raceway and the mechanism for reciprocating it. Figs. 10 to 14, inclusive, illustrate the automatically-operating clutch mechanism by means of which when the machine is started the vertically-stationary sets, with the work thereon, are fed forward a predetermined distance and then stopped. Fig. 15 represents a section on the line 15 15 of Fig. 1. Fig. 16 represents an enlarged section on line 16 16 of Fig. 1. Fig. 17 illustrates in section the holder for the stationary set, being a section on line 17 17 of Fig. 21. Fig. 18 represents a section on line 18 18 of Fig. 21, showing the work in place. Fig. 19 is a section on line 19 19 of Fig. 21. Fig. 20 illustrates in detail the means for holding the set-supports upon the carrier. Fig. 21 represents in side elevation the carrier for the longitudinally-stationary sets, said carrier being shown somewhat enlarged. Figs. 22, 23, and 24 illustrate the longitudinally-moving set and its details of construction.

Referring to the drawings, upon which I have shown a machine selected by me as illustrating one embodiment of my invention, and to the details of construction of which I do not intend to limit myself, $a$ indicates the frame or head of the machine, which is provided with the supporting-base $a'$. This frame or head may be formed or cast in one piece, and upon it are mounted the movable parts of the machine.

The base $a'$ is extended laterally, as shown in Fig. 6, to receive the journal-bearing bracket $a^2$, which is bolted thereon, as clearly shown in Fig. 6. A power-shaft $b$ is journaled in the head and in the bearing-bracket $a^2$, and loosely mounted thereon is a belt-wheel $b'$, by means of which movement is imparted thereto through clutch mechanisms which will hereinafter be described in detail. The head is laterally extended at its forward end, as at $a^3$, and grooved to form a guideway for the reception of a vertically-moving slide $c$, which carries the dies or sets $c'\ c'$, of which there are two, as shown in Fig. 2. These sets $c'\ c'$, which are illustrated in detail in Figs. 22 to 24, inclusive, each comprise a sleeve having a lower reduced portion $c^2$, fitting in an aperture $c^3$ in the slide and having its upper end formed to receive a fastening or eyelet. The sets are held in place by a cross-bar $c^4$, (shown in Fig. 18,) secured upon the top of the slide $c$ by a set-screw $c^5$. The sets are grooved at $c^6$ to receive the bar $c^4$, which is slotted at its ends and at its center, so that by loosening the set-screw $c^5$ the bar $c^4$ may be drawn forward to release the sets, whereby they may be removed and others inserted. Extending through each set is a pin $c^7$, pointed at its end to project through an eyelet and remove it from the raceway, as will be afterward explained, the lower end of the pin $c^7$ being provided with a head $c^8$, which rests upon a spring $c^9$, inserted in the hole or aperture $c^3$.

When the pin $c^7$ picks an eyelet from the raceway and the set $c'$ is brought in contact with the longitudinally-stationary set, the pin $c^7$ is depressed into the set $c'$ and does not interfere with the operation of the two dies or sets, this being clearly shown in Fig. 4.

The movable slide is held in place in the head by a cap-plate $c^{10}$, secured to the laterally-projecting portion $a^3$ by bolts $c^{11}$, and reciprocatory movement is imparted to the slide by a bell-crank lever $d$, pivoted to the head at $d'$ and operated by a crank $b^2$, extending from a disk $b^3$ on the crank-shaft $b$, and a head or link $b^4$, connected to the crank and to the bell-crank lever.

The arm $d^2$ of the bell-crank lever is provided at its end with a roll $d^3$, projecting into an aperture $c^{12}$ in the lower end of the slide $c$, so that for each revolution of the crank-shaft the slide is reciprocated once.

The longitudinally-stationary sets, dies, or anvils are indicated at $e\ e$, and there are as many of them as there are apertures in the upper for the eyelets—that is to say, if it is intended to insert six eyelets in each edge of the upper there are twelve longitudinally-stationary sets (or six pairs) and they are mounted in two gangs of six each. As will be described in detail, they are mounted upon a carrier and are fed forward step by step to bring each pair successively into alinement with the longitudinally-movable dies or sets $c'\ c'$. The carrier for the vertically-stationary dies, sets, or anvils consists of a plate $f$, as shown in Fig. 4, U-shaped in plan view, with its two parallel members $f'\ f'$ sliding in horizontal grooves in the upper portion $a^4$ of the head, and one of the members $f^2$ is connected by a link $f^3$ with a lever $f^4$. This lever is angular, as shown, and at its elbow is provided with a roller $f^6$, bearing against a cam $f^7$ on the end of the shaft $f^8$ journaled in the head $a$. On the shaft is also secured a large gear-wheel $f^9$, driven by a pinion $b^5$ on the power-shaft $b$. If there are six anvils in each gang, then the ratio of the pinion to the gear-wheel is as one to six, so that the pinion will be rotated six times during a single rotation to the gear-wheel $f^9$.

The cam $f^7$ is spiral and is provided with a series of dwells or pauses 3, 4, 5, 6, 7, and 8, one for each pair of sets or anvils, so that as the gear-wheel $f^9$ rotates the cam $f^7$ will raise the lever $f^4$ and feed the anvil-carriage forward, allowing it to pause an instant at each complete rotation of the power-shaft $b$ for the lower sets to engage the pair registering therewith. The spiral spring $f^{10}$, having its lower end secured to a stud $f^{11}$, projecting out from the head, is connected at its upper end to the elbow of the lever $f^4$, so that when the cam $f^7$ has completed one rotation the spring will draw the vertically-stationary sets and their carriage back to their first position.

Pivoted beneath the anvil-carrier and on both sides thereof are supports $g\ g$, to which the anvils are directly secured. Each support consists of a bar having a stud $g'$ to project upwardly through the carriage $f$ and grooved to form a head $g^2$. A slotted bar $g^3$ engages the heads $g^2$ and itself is secured to the carrier by a set-screw $g^4$, as illustrated in Fig. 19. Each supporting-bar $g$ is slotted at its rear end, as at $g^5$, to receive a screw $g^6$, threaded into the carrier $f$, which operates to act as a stop to limit the inward movement of the said supporting-bar and also supports the rear end thereof.

Springs $h\ h$, secured at $h'\ h'$ to the carriage, are extended downwardly at their ends and provided thereat with studs $h^2$ to bear against the supporting-bars and hold them inward, with a yielding pressure, against the rollers $h^3\ h^3$, which are journaled in the ends of a cross-bar $h^4$, passed through the portion $a^4$ of the head, and hence as the carriage is thrust forward the supporting-bars are separated by the rollers, against which they press. In order to provide for eyelets being set in at varying distances from the edge of the upper, the inner operative edges $g^7$ of the said bars are curved in the proposed line of the eyelets, and the sets are placed in a similar line.

When the holes for the eyelets have been punched in the edges of the upper A, the sets $e$ are inserted therein and the work (or upper) is held against the carrier by the operative, as shown in Fig. 18, all of the dies of the gang simultaneously engaging the work, so that when the said sets are fed forward the work is carried along with them, the said dies holding the upper with its two edges opposing each other. Therefore when some of the apertures are set back slightly from the edges of the upper the anvils must be likewise set back out of line with the other anvils of the set, so that if the supporting-bars $g$ were mounted rigidly the sets which were set back would not register with the movable sets when they were fed forward. By curving the operative edges $g^7$ $g^7$, which bear against the rollers $h^3$, into a line similar to the line of the sets the springs $h$ force the supporting-bars inward as the curved portions of the said supporting-bars reach the rollers and the anvils are brought into direct alinement with the movable set. In this way the anvils or stationary sets may be arranged in any line, whether regular or irregular, and by forming the edges $g^7$ to conform therewith the anvils may be brought properly into alinement with the movable sets when they are fed forward thereto.

Each of the sets or anvils $e$ is passed downwardly through its supporting-bar, as shown in Fig. 16, and bears against a screw $e^{19}$, engaging the threaded portion of the aperture, said set being secured rigidly in place by a set-screw $e'$, passed into the side of the supporting-bar. Each set is provided with a downwardly-projecting portion $e^2$ to extend through an aperture in the upper and to project into an eyelet, each being likewise formed with the portion $e^3$ to turn the edges of the eyelet.

When the upper has been properly punched along its edges for the reception of the eyelets, it is placed in the machine with the ends of the longitudinally-stationary sets projecting through the apertures, and as the carrier is advanced the eyelets are set two by two or in pairs in the opposing apertures by the two coacting pairs of sets until all the eyelets are inserted in place, whereupon the spring $f^{10}$ immediately withdraws the carrier, so that a new upper may be placed thereon.

The feeding movement of the work—the upper—carried by the ends of the longitudinally-stationary sets is in a direction transverse to a line intersecting the two pairs of setting devices. Hence the machine is adapted to set fastenings in pairs along the opposing edges of the upper of a shoe; but it is to be understood that I do not limit myself to the feed being obtained by the movement, as described, of the gang of stationary sets, for my invention comprehends the holding of the longitudinally-stationary sets in lateral fixed position and obtaining the feeding movement by moving the longitudinally-movable sets in a lateral direction. In other words, my invention comprehends effecting a relative feeding movement in a direction transverse to a line intersecting the two pairs of setting devices.

The eyelets or fasteners are fed automatically to the movable sets through two inclined raceways $i$ $i$, mounted on a slotted plate $i^8$, which is secured at $i'$ $i^2$ to a carriage $j$. At the upper end of each raceway is a reservoir $i^3$, which supplies the eyelet automatically thereto, and at its lower end each raceway is provided with a stop (not shown) for holding the lowest eyelet therein in alinement with the movable set beneath it. The extremity of each raceway is likewise slotted, as shown in Fig. 23, so that the pin $c^7$ may rise through an eyelet and hold it stationary while the chute is drawn rearwardly.

The carriage is U-shaped in plan view and is provided with two members lying on each side of the upper portion $a^4$ of the head and sliding in grooved guides $a^6$, projecting laterally from the said upper portion $a^4$. Springs $j'$ bear upon the parallel forwardly-projecting members of the carriage to hold them against the guides, the springs themselves being held against upward movement by screws $j^2$, passed through lugs $j^3$, projecting laterally from the head. The springs are curved, as shown in Fig. 3, and their ends lie in grooves in the tops of the parallel members of the carrier, said grooves being formed by side bars $j^4$, screwed to the said members. The parallel parts of the carrier are connected in the rear of the portion $a^4$ of the head by the cross-bar $j^6$, in which is mounted an adjustable bunter-screw $j^7$ to operate as a stop and limit the forward movement of the carriage.

The arm $d^5$ of the bell-crank lever $d$ is shod with some cushioning material (shown at $d^6$) and extends between two lugs $j^8$ $j^8$, projecting downwardly through a slot in one of the guides or slideways $a^6$. The distance between the lugs $j^8$ is greater than the cross-diameter of the upper end of the arm $d^5$, so that the carriage is allowed to pause momentarily at each forward and backward movement of the bell-crank lever $d$ to permit each of the pins in the lower sets $c'$ to pick off an eyelet from the lower end of one of the raceways. The parts are so timed that when the carriage reaches its forward position the lower sets rise and the pins thereof each take an eyelet, whereupon the carrier is immediately moved to the rear out of the way while the sets continue to rise.

Agitating devices (not shown) in the reservoir $i^3$ are connected by crank-arms $k$ $k$ to a cross-link $k'$, which in turn is connected by a bell-crank lever $k^2$ with an arm $k^3$, extending out from the head, so that as the carrier is reciprocated the agitators will be oscillated, this latter mechanism being shown more particularly in Fig. 5.

The triangular supporting-plate $i^8$, which is slotted to receive the head, as shown in Fig. 5, is formed with downwardly-projecting ears $i^9$ to extend on either side of the cross-bar $j^6$ of the carrier, whereby they may be secured thereto by the pivot stud or pin $i'$, as shown in Fig. 6, and the raceways and reservoirs are secured thereon by any desired means.

By clutch mechanism which I shall now describe the depressing of a lever starts the machine in operation and eyelets are inserted in pairs in all of the apertures in the upper, after which the carriage for the anvils is withdrawn and the machine automatically stopped. This clutch mechanism comprises a bell-crank lever $m$, pivoted at $m'$ to the head and having depending from the arm $m^2$ thereof a link $m^3$, which connects it with a treadle. (Not shown.) The arm $m^2$ is likewise connected to a spring $m^4$, which tends to hold it raised and operative, the upper end of the spring being secured to a stud $m^5$, extending out from the head $a$. The arm $m^6$ of the bell-crank lever has secured to it a cam-catch $n$, which is wedge-shaped and provided with an edge and a socket to be described. The bell-crank lever is likewise provided with a pin $n'$, extending into an L-shaped slot $o'$ in a lever $o$, pivoted at $o^2$ to the head. The end of the lever $o$ is provided with a beveled end or cam $o^3$, against which a pin $o^4$ on the gear-wheel $f^9$ may engage once during each rotation thereof to tilt the lever and allow the pin $n'$ to slide forward in the lower portion of the L-shaped slot $o'$ and permit the spring $m^4$ to press the cam-latch $n$ inwardly toward the shaft $b$. The lever $o$ has secured to it a weight $o^5$, which tends to depress its slotted end, so that the pin $n'$ will be normally in the vertical portion of the slot and the cam-catch will be held thus from moving toward the shaft $b$, said weight consequently raising the end $o^3$ of the said lever into the path of the pin $o^4$. When the said pin $o^4$ engages the end $o^3$ of the lever $o$, the other end is raised and the spring $m^4$ is free to throw the cam-catch into operation.

The power-wheel $b'$ is provided with a flange $b^9$, having a V-shaped notch $b^{10}$ to receive a latch-bar $p$, secured to the shaft $b$ to turn therewith. The latch-bar is bifurcated, as shown in Fig. 14, to project above and below a block $p'$, which is rigidly attached to the shaft $b$ by a pin $p^2$, (shown in Fig. 11,) and the said bar is pivoted to the said block by a bolt $p^2$, passed entirely through the block on the other side of the shaft $b$. A spring $p^3$ is coiled about the head of the bolt $p^2$ and has its ends crossed and secured respectively to a stud $p^4$, projecting upwardly from the latch-bar $p'$, and a stud $p^5$, projecting upwardly through the block $p'$. The end of the latch-bar is beveled, as shown in Fig. 12, whereby it is normally drawn by the spring $p^3$ into the notch $b^{10}$ in the flange $b^9$ whenever permitted to do so. When the pin $n'$ is in the laterally-extended portion of the slot $o'$, the spring $m^4$ lifts the end $m^2$ of the bell-crank lever $m$ and thrusts the cam-catch forward, so as to engage the latch-bar and prevent it from being carried around with the wheel $b'$; but when the treadle (not shown) is depressed and the arm $m^6$ of the bell-crank lever is thrown outwardly, so as to disengage the cam-catch $n$ from the latch-bar $p$, the latter is thrown about its pivot $p^2$, so as to enter the notch in the flange $b^9$ and be carried around with the wheel $b'$. As the catch is thrown outward the weight $o^5$ tilts the lever $o$ and the pin $n'$ rests in the upwardly-extending portion of the slot $o'$, being prevented by the walls thereof from being thrown inward again by the spring $m^4$ when the foot is removed from the treadle. Hence the shaft $b$ rotates until the pin $o^4$ on the gear-wheel $f^9$ engages the end of the lever $o$ and tilts it in the opposite direction. Thereupon the spring $m^4$ immediately throws the cam-catch toward the shaft $b$ into the path of the latch-bar $p$, and the latch-bar, engaging the beveled end of the catch, is thrown out of the notch in the flange $b^9$ and strikes against the edge $n^2$ of the said catch, whereby the belt-wheel and the shaft are unclutched and the rotation of the shaft is immediately stopped, the end of the latch thus being thrown into the socket $n^3$ of the catch, whereby it is held from rebounding. Thus the operator has only to depress the treadle once, after which he may remove his foot, and the machine will operate until all of the eyelets have been set in the upper.

From the foregoing it will be observed that I have provided a machine by means of which the eyelets or other fastenings are set in pairs in the opposing edges of a shoe-upper or in work of any other kind, whereby the time and labor incident to eyeletting are reduced by one-half. The machine is highly efficient in operation, is comparatively simple in construction, and is entirely automatic, the only manual labor formed by the operation being to place the upper in the carrier and hold it thereon and to depress the treadle to start the machine.

While the machine as illustrated and described is particularly well adapted for setting eyelets in pairs along the edges of a shoe-upper, the fact will be recognized that the operative devices on one side of the machine may be dispensed with and only one gang of longitudinally-stationary sets employed, whereby the machine may be used for setting eyelets in other kinds of work. The carrier may move, if desired, in lines parallel to the power-shaft instead of in lines transverse thereto, and the parts may be otherwise arranged without departing from the spirit and scope of the invention.

Having thus explained the nature of the invention and described a way of constructing and using the same, though without attempting to set forth all of the forms in which it may be used or all of the modes of its use, I declare that what I claim is—

1. A machine for setting fastenings in shoe-uppers, comprising two pairs of setting devices, means for simultaneously operating them, means for holding the upper with its two edges opposing each other in position for the setting operation, and means for effecting a relative feeding movement in a direction transverse to a line intersecting the two pairs of setting devices.

2. A machine of the character described having means for setting fastenings in pairs in the opposing edges of a shoe-upper, means for separately holding the two edges of the upper in position for the setting operation, and means for automatically feeding the work until the proper number of pairs of fastenings have been set in place.

3. A machine of the character described comprising setting devices for automatically securing a series of pairs of fastenings in the opposing edges of a shoe-upper, means for separately holding the two edges of the upper in position for the setting operation, and means for supplying fastenings to the setting devices.

4. A machine of the character described, comprising setting devices for automatically securing a series of pairs of fastenings in the opposing edges of a shoe-upper, means for separately holding the two edges of the upper in position for the setting operation, means for supplying fastenings to the setting devices, and mechanism for automatically stopping the machine when a predetermined number of pairs of fastenings have been secured.

5. A machine for setting fastenings comprising an operative die, and a gang of parallel dies, each adapted to coact with the first-mentioned die.

6. A machine for setting fastenings comprising a longitudinally-moving die, and a gang of parallel dies movable across the lines of movement of said die, each of the dies of the gang being adapted to register with the said first-mentioned die.

7. A machine for setting fastenings comprising a longitudinally-moving die, and a gang of parallel dies movable across the lines of movement of said die, and means for bringing the dies of the gang successively into operative position with respect to said die.

8. A machine for setting fastenings comprising a longitudinally-moving die, and a gang of parallel dies movable across the lines of movement of said die, and arranged in other than a straight line, and means for successively bringing the said dies of the gang into a position to register with the first-mentioned die.

9. A machine for setting fastenings comprising a longitudinally-reciprocating die, a gang of longitudinally - stationary parallel dies, and means for transversely moving each of the dies of the gang to cause it to register with the longitudinally-movable die.

10. A machine for setting fastenings comprising a longitudinally-movable die, a gang of parallel dies, a carrier for said gang, and mechanism for imparting a step-by-step movement to the carrier, for the purpose described.

11. A machine for setting fastenings comprising a longitudinally-movable die, a carrier movable transversely to the path of movement of the said die, and a gang of dies detachably secured to the said carrier, and arranged to simultaneously engage the work.

12. A machine for setting fastenings comprising a longitudinally-movable die, a carrier movable transversely to the path of movement of the said die, a supporting-bar detachably connected to the carrier, and a gang of dies inserted in said supporting-bar.

13. A machine for setting fastenings comprising a longitudinally-movable die, a gang of dies, a carrier for said gang of dies movable transversely of the path of movement of the longitudinally-movable die, and a support to which said gang of dies is directly secured mounted on said carrier to have a movement transverse to the path of movement thereof.

14. A machine for setting fastenings comprising a movable die, a gang of dies, a laterally-yielding support for said gang of dies, means for moving said support transversely of the path of movement of said movable die, and a roller against which the said support rests.

15. A machine for setting fastenings comprising a movable die, a gang of dies, a support for said gang of dies, having a curved operative edge, a stationarily-mounted roller, a spring for holding the support against the roller, and means for moving said support longitudinally transversely of the path of movement of the first-mentioned die.

16. A machine for setting fastenings comprising a gang of dies, a carrier therefor, a lever connected to the carrier, and a cam operating on said lever to feed the carrier forward, said cam having as many dwells as there are dies in the gang.

17. A machine for setting fastenings comprising a longitudinally-movable die, a gang of dies each adapted to register with the first-mentioned dies, a carrier for the said gang of dies, a pivoted lever connected to said carrier, a spring connected to the lever to withdraw the carrier, and a spiral cam for acting on the lever to advance the carrier.

18. A machine for setting fastenings comprising two longitudinally-movable parallel dies, two gangs of parallel dies adapted respectively to register successively with the first-mentioned dies, and a carrier for said gangs of dies.

19. A machine for setting fastenings comprising two longitudinally-movable dies, two gangs of dies adapted respectively to register successively with the first-mentioned dies, and arranged to be movable toward and from each other, and means for imparting a step-by-step movement to the said gangs.

20. A machine for setting fastenings comprising two longitudinally-movable dies, two gangs of dies adapted respectively to register successively with the first-mentioned dies, a carrier for the said gangs, means for moving said gangs toward or from each other, and means for advancing and withdrawing said carrier.

21. A machine for setting fastenings, comprising a longitudinally-movable slide having a plurality of dies, a carrier movable transversely of the slide, and having two gangs of parallel dies, means for reciprocating the slide, and means for advancing the carrier one step for each reciprocation of the slide.

22. A machine for setting fastenings comprising a longitudinally-movable die, a gang of parallel dies movable successively into coactive relation to said die, means for reciprocating said die, and means for successively advancing said gang of dies, one step for each reciprocation of the said die.

23. A machine for setting fastenings comprising a longitudinally-movable die, a gang of dies movable successively into coactive relation to said die, means for successively advancing said gang of dies, one step for each reciprocation of the said die, and means for returning said gang after the last die thereof has been brought into coaction with said stationary die.

24. A machine for setting fastenings comprising a longitudinally-movable die, a gang of dies movable successively into coactive relation to said die, means for reciprocating said die, means for successively advancing said gang of dies, one step for each reciprocation of the said die, means for returning said gang after the last die thereof has been brought into coaction with said stationary die, and mechanism for stopping the machine upon the withdrawal of the said gang.

25. A machine for setting fastenings, comprising a longitudinally-movable die, a gang of parallel dies movable successively into coactive relation to said die, a chute or raceway for supplying fastenings to said die, and mechanism for advancing the said gang of dies with a step-by-step movement, reciprocating said die, and reciprocating said raceway.

26. A machine for setting fastenings, comprising a longitudinally-movable die, a gang of dies, a carrier for said gang of dies movable transversely of the path of movement of the said die to bring each die of the gang into coactive relation thereto, a shaft having a crank-and-lever connection with the first-mentioned die to reciprocate it, a lever connected to said carrier, a spiral cam to operate the lever, and gearing between the shaft and cam, said gearing being constructed and arranged to rotate said cam once for a number of rotations of the shaft, equal to the number of dies in the gang.

27. A machine for setting fastenings, comprising a head, two pairs of coacting dies, a slotted V-shaped slide reciprocatory in guides on both sides of the head, and two raceways supported on the slide for supplying fastenings simultaneously to the head.

28. In an eyeleting-machine, a carrier, two supports connected to the carrier, a gang of dies secured in each support, and means for removably holding said supports on the carrier.

29. In an eyeleting-machine, a slide having parallel longitudinal apertures, a set in each aperture, and a slotted plate for engaging and detachably securing the sets in the said apertures.

30. In a machine for setting fastenings, a reciprocatory carrier having a plurality of setting-tools in a single plane, a wheel for imparting a feeding movement to the carrier, a power-shaft for rotating said wheel once for every predetermined number of rotations thereof, a power-wheel loose on said shaft, a clutch mechanism for connecting the power-wheel and the shaft, and devices for throwing the clutch mechanism out of operation when the said carrier-moving wheel has made a complete rotation.

In testimony whereof I have affixed my signature in presence of two witnesses.

HERBERT H. BUFFUM.

Witnesses:
A. D. HARRISON,
C. F. BROWN.